United States Patent [19]

Vossen

[11] 4,298,135
[45] Nov. 3, 1981

[54] COVER FOR FRYING PANS OR SIMILAR VESSELS

[75] Inventor: Franz Vossen, Stockach, Fed. Rep. of Germany

[73] Assignee: Huggles & Meurer, Libellenweg, Fed. Rep. of Germany

[21] Appl. No.: 49,344

[22] Filed: Jun. 18, 1979

[30] Foreign Application Priority Data

Apr. 12, 1979 [DE] Fed. Rep. of Germany ....... 2915274

[51] Int. Cl.³ ............................................. B65D 51/16
[52] U.S. Cl. ...................................... 220/371; 55/384; 220/94 A; 220/287; 220/369
[58] Field of Search ...................... 220/94 A, 369, 370, 220/371, 287, 372; 55/384

[56] References Cited

U.S. PATENT DOCUMENTS

| 173,041 | 2/1876 | Morgan | 220/372 |
|---|---|---|---|
| 287,425 | 10/1883 | Dowdell | 220/287 |
| 632,612 | 9/1899 | Warfel | 220/8 |
| 1,807,271 | 5/1931 | Asadoorian | 220/369 |
| 2,641,403 | 6/1953 | Buttery | 229/1.5 B |
| 2,687,026 | 8/1954 | Gleason | 55/384 |
| 2,760,672 | 8/1956 | Cronheim | 220/287 |
| 2,770,389 | 11/1956 | Drahoff | 55/384 |
| 3,343,345 | 9/1967 | Carolan | 220/371 |
| 3,366,309 | 1/1968 | Scharre | 229/43 |
| 3,528,236 | 9/1970 | Merrick | 55/384 |

FOREIGN PATENT DOCUMENTS 3761 of 1912 United Kingdom ................ 220/287

Primary Examiner—George E. Lowrance
Attorney, Agent, or Firm—Hane, Roberts, Spiecens & Cohen

[57] ABSTRACT

A cover for a frying pan comprising at least one absorptive, at least partially air-pervious surface of a filter material such as filter paper, filter wadding, fabric or the like. The filter material can be provided with openings which are at least partially covered. The filter material can be secured in a circumferential ring which extends in the plane of the cover or approximately perpendicular to such plane. The cover can also be curved in the shape of a hood.

5 Claims, 5 Drawing Figures

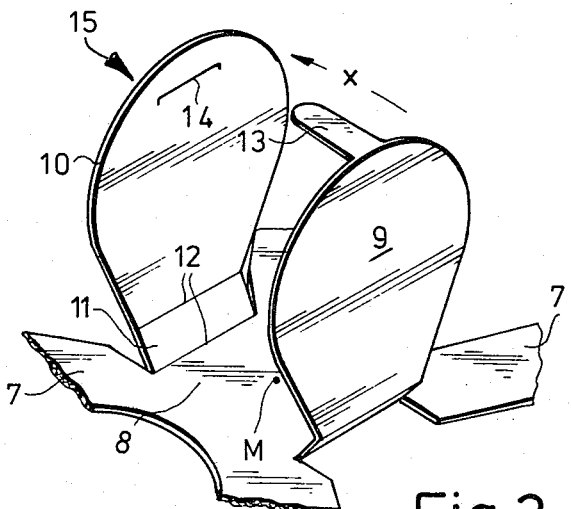
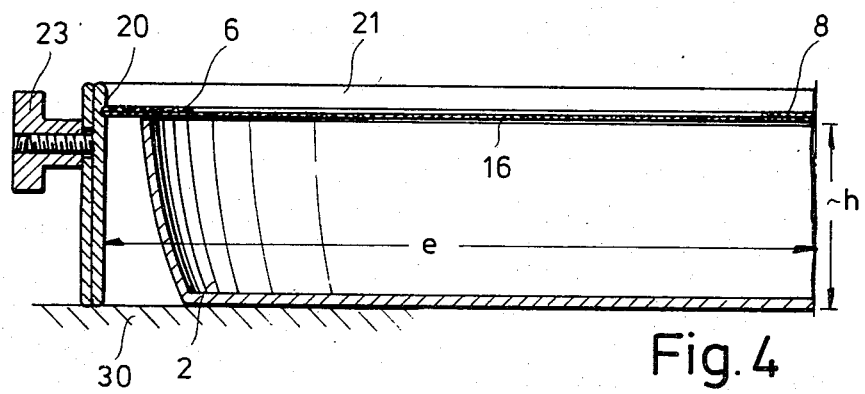
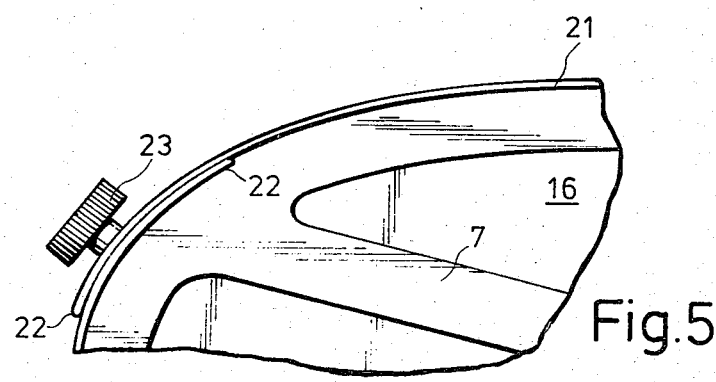

COVER FOR FRYING PANS OR SIMILAR VESSELS

BACKGROUND OF THE INVENTION

The present invention relates to a cover for frying pans or similar vessels, optionally provided with a handle or lift ring. Such covers, which are generally made of metal, are customarily used for pots but when used on frying pans they considerably interfere with the frying. If the user, for instance, places the cover on the frying pan, as a protection against spattering, the oxygen conditions within the frying pan itself are changed to the detriment of the frying.

SUMMARY OF THE INVENTION

In view of this, an object of the invention is to provide a cover for a frying pan or similar vessels which, on the one hand, provides sufficient protection against spattering and, on the other hand, does not interfere with the frying itself or even has an advantageous effect thereon.

This object is achieved by a cover which has at least one absorptive, at least partially air-pervious surface of filter paper, filter wadding, fabric or similar material. As a result thereof, the frying pan can now be covered and the supply of oxygen nevertheless maintained.

The filter paper can be that used for the filtration of coffee or the like, and therefore is a material which is readily available on the market. This makes it possible to reduce the cost of manufacture of the cover. However, it is also conceivable to provide the cover with openings over which parts of the filter material extend, in the manner of so-called potato grates, since they, on the one hand, permit the admission of oxygen while, on the other hand, prevent the spattering of the fat.

Another advantage of the use of absorptive filter paper is that water which rises with the spattering fat becomes attached to the cover and no longer drops back onto the food being fried; as has been shown by experiments, the frying process itself is delayed by such liquid, and this can now be prevented.

Preferably, the cover has at least one circumferential ring to which the filter paper, filter wadding, fabric or the like is attached. This circumferential ring can extend in the plane of the cover itself or be approximately at right angles thereto. It has been found particularly favorable to fasten the circumferential ring located in the plane of the cover in replaceable manner in a further circumferential ring which is perpendicular to said plane and thus forms a vertical circumferential ring. In accordance with the invention, the cover then extends beyond the pan which is covers and it is fastened outside the pan in the vertical circumferential ring. In further accordance with the invention, the further ring may be adjustable both with respect to the clamping height for the cover and with respect to the circumference of the pan to be covered.

The invention contemplates all shapes of covers, depending essentially on the specific shape of the pan.

Of particular importance for the usefulness of such covers is their uncomplicated construction, their low cost and, consequently, the possibility of dispensing with cleaning; whenever frying fat or the like must be removed from such a cover, the cover is only used very infrequently. Accordingly, the invention conceives a simple embodiment of the cover which is then made, in accordance with the invention, of a disk of material, preferably a sheet of cardboard, produced, for instance, by stamping out windows which are then covered by filter paper or fabric, the windows being defined by a circumferential ring of the cover and by transverse or radial arms which reinforce the ring. This embodiment constitutes a throw-away article which does not entail any particular complications, either with respect to its manufacture or its use.

For use, it has proven favorable by stamping windows out of the disk of material to leave tongue-shaped tabs which can be brought together to form a handle or grip, so that the user can remove and hold the cover in his hand when inspecting the course of the frying.

Although any type of sheet material can be used for the circumferential ring and its spoke-like arms, it is advisable, for reasons of economy, to use a cardboard disk of any desired shape.

The concept of the invention, however, also includes making the cover of a single mat or filter disk of the same material without a circumferential ring or reinforcing cross or radial arms, in which case a handle or grip can optionally be developed on the cover for lifting the cover from the pan. Such a mat or filter disk can be clamped in a circumferential ring which surrounds the pan, in the manner, for example, when a cloth to be embroidered is placed in an embroidery frame.

The invention also contemplates a hood-shaped cover with the filter paper, the covering hood being curved in dome-like manner over the pan or vessel to be covered.

Such a cover cannot be replaced either in the manner of its manufacture or with respect to its use, for example, by a wire sieve with a steel frame for permanent use since this filter is not effective. It must be cleaned in cumbersome fashion, and nevertheless the fat can spray through the screen openings, and ascending water and fat do not remain adherent to the wire screen but drop back onto the food being fried.

Further advantages, features and details of the invention will become evident from the following description of preferred embodiments, with reference to the attached drawing.

BRIEF DESCRIPTION OF THE FIGURES OF THE DRAWING

FIG. 3 is a perspective view on a larger scale of a detail on FIG. 2.

FIG. 4 is a sectional view corresponding to that in FIG. 2 through another embodiment of a frying pan.

FIG. 5 is a top plan view of a portion of the embodiment in FIG. 4.

DETAILED DESCRIPTION

Figure 2:
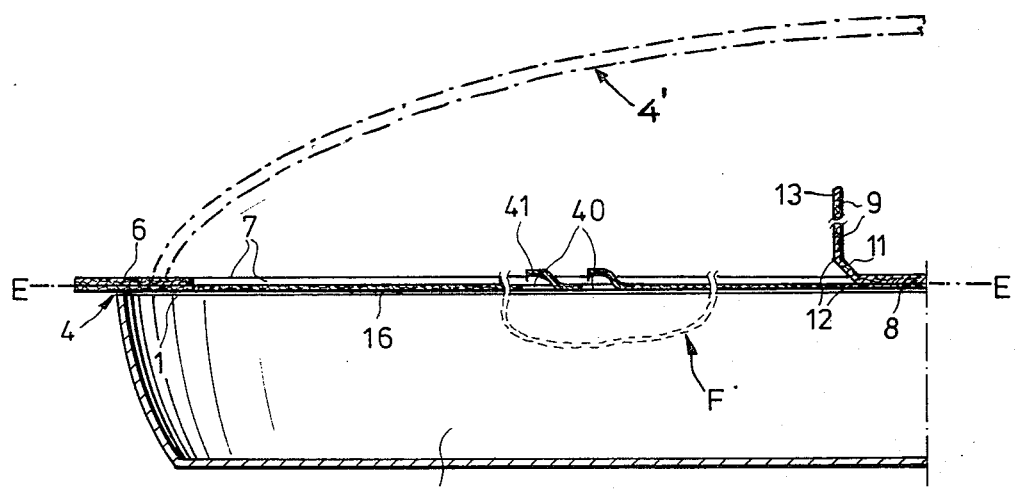
FIG. 2 is an enlarged radial section taken on line II—II in FIG. 1.
Figure 1:
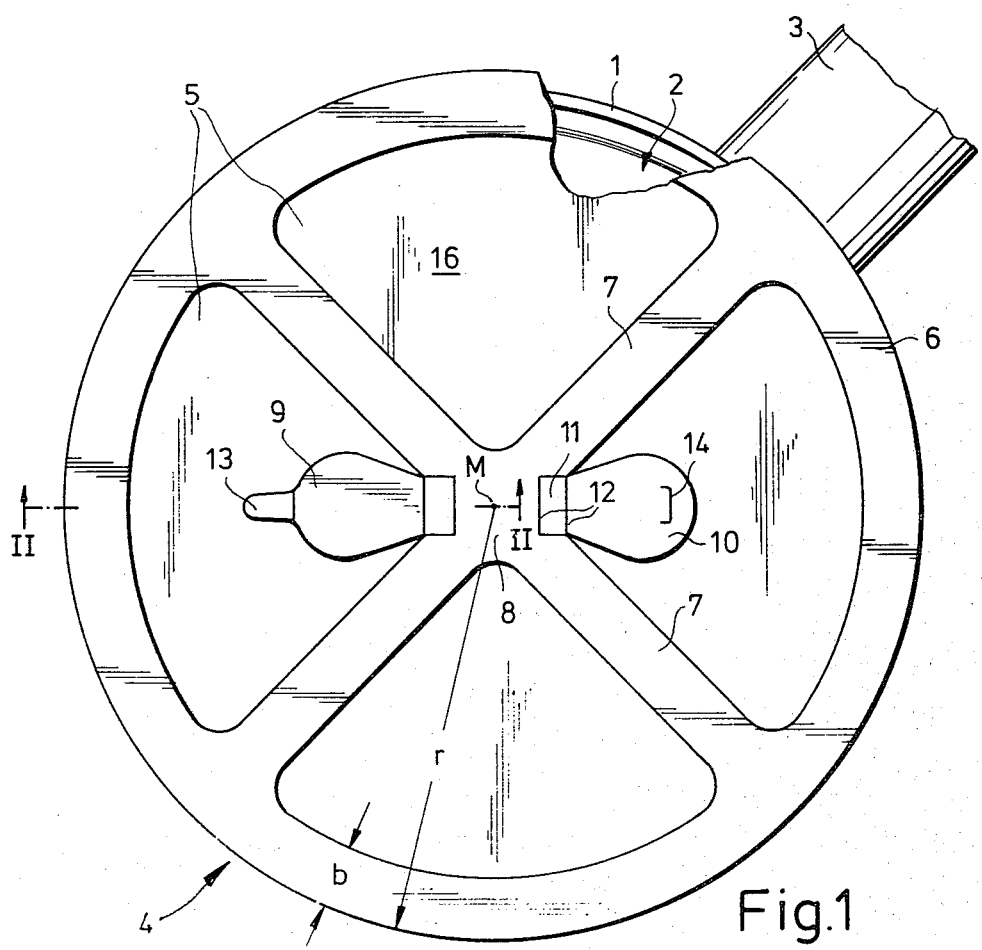
FIG. 1 is a top plan view of a frying pan with a cover partly broken away.

On the edge 1 of a frying pan 2 with a handle 3 there rests a support structure or disk 4 having a radius r, for instance, of 150 mm and consisting of cardboard, from which four sector-shaped windows 5 have been stamped out. The remaining parts of the cardboard disk 4 thus form a circumferential ring 6 of width b of 20 mm and spoke-like radial arms 7 which merge at the center M of the disk to form a central zone 8 for the cardboard disk 4.

In two opposite sector windows 5 there remains a respective tongue-shaped tab 9, 10 which, also cut out from the cardboard disk 4 upon the stamping operation, is connected by a narrow strip 11 to the central zone 8. The strip 11 is bounded on both sides by fold lines 12 and can be folded out of the plane E of the disk, as shown in FIG. 2.

The tab 9 is provided with an extension 13 which, in the folded position of the tabs 9, 10, can be pushed in the direction x into a slot 14 in the opposite tab 10 (FIG. 3) so that the two tabs, 9, 10 together form a carrying ring 15.

Adhesively secured at the bottom of the cardboard disk 4 at the edge ring 6 and radial arms 7 there is stretched a filter means comprising a sheet 16 of filter cellulose which extends below the sector-shaped windows 5. In another embodiment the filter sheet 16, or a plurality of such filter sheets, may also be placed on top of the cardboard disk 4.

In the embodiment shown in FIGS. 4 and 5, the cardboard disk 4 is clamped at 20 in a ring 21 whose radius e (FIG. 4) is adjustable. For this purpose, the free ends 22 of the fastening ring 21 overlap each other and can be securely fastened to each other in a given position by means of a clamping screw 23.

The clamping elements necessary for the clamping of the cardboard disk 4 in the region 20 have not been shown, in order not to complicate the drawing unnecessarily.

In FIG. 5 it is seen that the cardboard disk 4 and the fastening ring 21 need not only be circular but can, for instance, be oval. The shape of the disk 4 is selected as desired as a function of the frying pan which is to be covered. Furthermore, the clamping height h can be made adjustable with respect to the surface 30 on which the pan rests, for instance by means of two fastening rings 21 lying concentrically one within the other and displaceable with respect to each other.

The filter paper 16 can, for example, be that used as a coffee filter, but it may also be provided with openings 40 (FIG. 2) above which extend punched-out tongues 41. A cutout F in FIG. 2 shows that the filter paper is then similar to a coffee grate in its surface.

In accordance with another embodiment of the invention, the filter cover can be curved to form an arched hood in the manner of a cover for cheese or cake as diagrammatically illustrated in chain-dotted outline at cover 4' in FIG. 2.

What is claimed is:

1. A throw away cover for a frying pan comprising a planar disk of cardboard material mountable on a frying pan to cover the same, said disk having stamped-out sector-shaped windows defining a circumferential ring, a plurality of spoke arms extending radially from said ring and a region in which said spoke arms merge, and a filter paper adhesively secured on the underside of said disk and covering said sector-shaped windows, said filter paper being liquid-absorptive and at least partially air pervious, said sector-shaped windows being arranged in diametrically opposed pairs, said disk including two solid tongue-shaped tabs remaining after the sector-shaped windows are stamped-out, said tabs extending in the plane of said disk from said central region radially outwards in diametric opposition into two diametrically opposed windows, said tabs being foldably attached to said central region so that when upfolded from the plane of the disk the tabs are substantially perpendicular to the plane of the disk in opposed horizontally spaced relation, said tabs including interengageable members to secure the tabs together in the upfolded horizontally spaced position to form a lift ring for the cover in said central region.

2. A cover according to claim 1 comprising a support structure including a circumferential ring element to which said disk is replaceably engaged.

3. A cover according to claim 2 wherein said circumferential ring element extends approximately at right angles to the plane of the disk.

4. A cover according to claim 2 wherein said circumferential ring element includes means for adjusting the height thereof to adjust the position of the disk with respect to the top of the pan.

5. A cover according to claim 2 wherein said circumferential ring element has an adjustable radius.

* * * * *